United States Patent [19]

Dunbar

[11] Patent Number: 5,200,256
[45] Date of Patent: Apr. 6, 1993

[54] COMPOSITE LIGHTWEIGHT BULLET PROOF PANEL FOR USE ON VESSELS, AIRCRAFT AND THE LIKE

[76] Inventor: C. R. Dunbar, 5325 Chambord Dr., Greenwell Springs, La. 70739

[21] Appl. No.: 300,815

[22] Filed: Jan. 23, 1989

[51] Int. Cl.$^5$ ............... B63G 9/00; E06B 9/00; B32B 7/02; B32B 3/26
[52] U.S. Cl. ................. 428/212; 89/36.01; 89/36.11; 89/36.12; 109/49.5; 109/83; 428/246; 428/247; 428/252; 428/255; 428/256; 428/260; 428/272; 428/284; 428/285; 428/297; 428/298; 428/304.4; 428/314.4; 428/314.8; 428/911
[58] Field of Search ............. 428/911, 256, 212, 247, 428/256, 285, 246, 252, 255, 260, 272, 284, 297, 298, 304.4, 314.4, 314.8; 89/36.12, 36.11, 36.01; 109/49.5, 83

[56] References Cited

U.S. PATENT DOCUMENTS

| | | | |
|---|---|---|---|
| 4,111,097 | 9/1978 | Lasker | 428/911 |
| 4,292,882 | 10/1981 | Clausen | 429/911 |
| 4,529,640 | 7/1985 | Brown et al. | 428/911 |
| 4,608,717 | 9/1986 | Dunbavand | 428/911 |
| 4,613,535 | 9/1986 | Harpell et al. | 428/911 |
| 4,664,967 | 5/1987 | Tasdemiroglu | 428/911 |
| 4,732,803 | 3/1988 | Smith, Jr. | 428/212 |

Primary Examiner—George F. Lesmes
Assistant Examiner—James D. Withers
Attorney, Agent, or Firm—Pravel, Gambrell, Hewitt, Kimball & Krieger

[57] ABSTRACT

A lightweight armor lining for use in projecting objects such as vessels and like craft from high speed projectiles includes an extended sheet-like body having a weight of less than eight (8) pounds per square foot and having an inner strike surface being positioned away from the object to be protected in order to receive incoming projectiles. A first layer of woven fabric material is carried at a position adjacent the outer strike surface layer and a second layer of material is carried internally of the woven layer between the outer strike and an inner attachment surface. A third layer of energy absorbent material is positioned adjacent the inner attachment surface and interfaces with the second fabric layer.

16 Claims, 3 Drawing Sheets

COMPOSITE LIGHTWEIGHT BULLET PROOF PANEL FOR USE ON VESSELS, AIRCRAFT AND THE LIKE

BACKGROUND OF THE INVENTION

1. Field of the Invention

The present invention relates to lightweight armor lining for use in protecting objects such as marine vessels, helicopters, fixed wing aircraft and the like. Even more particularly, the present invention relates to a lightweight, multilayer armor in the form of a sheet that can be formed to an outer surface of vessels, or like craft, and having a weight as low as six–eight (6–8) pounds per square foot of surface area, yet still withstand substantial arms fire including Class 1–Class 5 threats.

In a heavier embodiment Class 6 threats (e.g. U.S. .50 caliber machine gun and Soviet 12.7 mm machine gun can be stopped.

2. General Background

In the protection of our coastline and port cities against illegal drug trafficking and customs violators, various craft are used for patrolling the waterfront, and if necessary for chasing villans. These vessels are often relatively small vessels, used for their speed and relative economy. In the construction of such marine vessels, as with pursuit air craft, weight is a critical factor. Lightweight vessels, having maximized horsepower, achieve higher speeds.

Unfortunately, drug traffickers, smugglers, pirates and like characters are sometimes similarly equipped. Not only do such criminals have fast vessels they are usually well armed. The prospect of all or nothing, riches or prison, drives the criminal to carry ever more sophisticated weapons in achieving the illicit goal. Machine guns, high powered rifles, and the like are facing law enforcement personnel when they attempt to chase a suspect vessel.

Many enforcement vessels use sophisticated, but highly vulnerable electronic equipment. Some vessels use computers as part of the operational heart of the vessel so that a well placed shot can render the vessel dead in the water. Protection of personnel and explosive munitions is a problem on small enforcement vessels as small arms fire can hit either during a confrontation.

Various methods of armor plating have commonly been used by the marine industry in constructing warships. Thick steel plating is a most common solution to the protection problem. While this solution is valuable and acceptable on large "battlewagons" such as aircraft carriers, battleships, and the like it is not always a viable alternative for swift lightweight pursuit type patrol boats.

Personnel have often been protected with bullet proof clothing such as vests, some made of a flexible fabric material. Some flexible protective clothing is layered, using fabric, foam, metal, metal mesh, and/or a mesh of plastic or polymer material. Many of these forms of protective clothing have been patented.

U.S. Pat. No. 3,813,281 entitled "Composite Flexible Armor" shows multiple layers of material as part of an armor construction which is flexible.

The McArdle U.S. Pat. No. 3,294,038 entitled "Fragment Suppression Configuration" provides a protective system that includes a blanket portion composed of at least two layers of ballistic nylon felt interposed with an inner lamination or ply and enclosed with a ballistic nylon cloth envelope. A prime protective surface or layer composed of ceramic or tile assembly incorporates a plurality of individual slightly spaced tiles each mounted with its faceside boned to an overlapping double layer glass cloth and its rearside covered with a separate metal backplate which is bonded with the metal backplate side and overlapping portions of the glass cloth against the faceside of the blanket.

An armored skin-diving suit is the subject of U.S. Pat. No. 4,356,569 issued to Sullivan. The device provides a flexible garment portion with a plurality of armor elements spaced at intervals thereon.

Vests are commonly constructed of material having projectile stopping capabilities. An example of a bullet proof vest is seen in U.S. Pat. No. 4,483,020 issued to Dunn entitled "Projectile Proof Vest". The device includes a network of inner shock resistant plates lying under a layer of ballistic material to minimize the force imparted by a slowing projectile upon the wearer of the vest.

An example of metal armor is seen in U.S. Pat. No. 4,534,266 entitled "Composite Armor Plating" issued to Huet and assigned to Aluminum Company of America. The device provides a composite metal armor comprising ceramic inserts arranged in a regular manner within a metal casing.

The Brandt U.S. Pat. No. 4,633,528 entitled "Bullet Affecting/Deflecting Material" provides a plate adapted to form a device for protecting the human body or the like which has one surface formed in a plane at an angle with respect to the plane of the opposing surface. Pairs of such plates with angle surfaces abutt and can be enclosed in pockets formed in a flexible material to provide a sheet of protective material. A plurality of pairs of the plate can be arranged in overlapping pockets in rows and columns to form a protective vest or coat.

U.S. Pat. No. 4,633,756 issued to Rudoi entitled "Bullet Proof Armor Shield" provides a shield construction that includes a composite layering of ceramic-like armor plate and layers of nylon-like cloth which provides a degree of ballistic resistance and relatively lightweight. The construction is characterized by an elongated armor component having an outer housing having a generally trapezoidal or parallelogram cross-section taken along a plane normal to the longest dimension.

Another patent which discloses a bullet proof vest is shown in the Fritch U.S. Pat. No. 4,660,223 entitled "Protective Body Armor". In that patent, multiple panels are assembled to provide front and back body armor inserts to be worn under regular clothing. Each panel consist of a ply of titanium metal bonded to a ply of aramid fiber woven cloth. The panels are arranged in overlapping and in abutting relationship but are not joined to one another except by way of overlying and underlying felted material plies. This provides an insert that is capable of some degree of flexing and adjustment on the body of the wearer. Backup strip panels protect the wearer along abutting zones of the main panels.

SUMMARY OF THE PRESENT INVENTION

These prior art devices relate primarily to armor plating which is suitable for protecting individuals from pistol fire. The present invention rather provides a composite armor for use in protecting vessels and the like wherein the projectiles must not only withstand the small arms fire (typically pistol) but also high power rifle fire and additionally the corrosive atmosphere of saltwater. Further, the armor of the present invention can be conformed to the contours of the vessel yet at the same time be of lightweight material having a weight of for example one to twelve pounds (1-12) per square foot so as not to materially effect the weight of the overall vessel. Typically the present invention can handle a class one threat (e.g., .22 caliber) through and including a class 6 threat (e.g. a .50 caliber U.S. machine gun with armor piecing bullets).

The present invention thus provides an improved lightweight armor lining for use in protecting objects such as vessels and like craft from powered high speed projectiles. The apparatus includes an extended sheet-like body having a weight of one to twelve pounds (1-12) per square foot and having an inner strike surface being positioned away from the object to be protected in order to receive incoming projectiles. A first layer of compression molded composite fabric material is carried at a position adjacent the outer strike surface. A second layer of material carried internally of the composite fabric layer is positioned between the outer strike and the inner attachment surfaces and a third layer of energy absorbent material, preferably foam, is positioned adjacent the inner attachment surface and innerfaces with the composite fabric and wire mesh layers.

In the preferred embodiment, the armor lining apparatus has a weight of between one and twelve (1-12) pounds per square foot of surface area.

In the preferred embodiment, the first layer is a composite fabric layer preferably compression molded into a board-like form with a binder resin.

In the preferred embodiment, the second layer is a high tensile strength mesh wire.

In the preferred embodiment, the third layer is a foam layer.

In the preferred embodiment, there are multiple layers of wire mesh positioned adjacent one another.

In the preferred embodiment, the armor panel can receive and catch without complete penetration therethrough, class one through class six projectiles.

In the preferred embodiment, the armor lining can receive and catch without complete penetration therethrough and incoming class five (5).

In the preferred embodiment, the lining is a substantially waterproof material.

While fabric vests have been developed that can protect individuals, most of these forms of protective clothing are directed to stopping small arms fire such as from pistols. Marine pursuit vessels such as those used by the U.S. Coast Guard, U.S. Customs service and the like require lightweight yet effective protection for vital spots including personnel, electronics, fuel supply, ammunition storage and the like. Because these vessels must function in a hostile marine environment, usually saltwater and in rough seas, any armor must be resistant to water to salt corrosion, and easily removable/transportable during storms so that the vessels center of gravity can be lowered. Further, such vessels can be fired upon by automatic weapon fire wherein multiple rounds hit the armor in close proximity. The armor must be able to withstand such repetitive hits.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
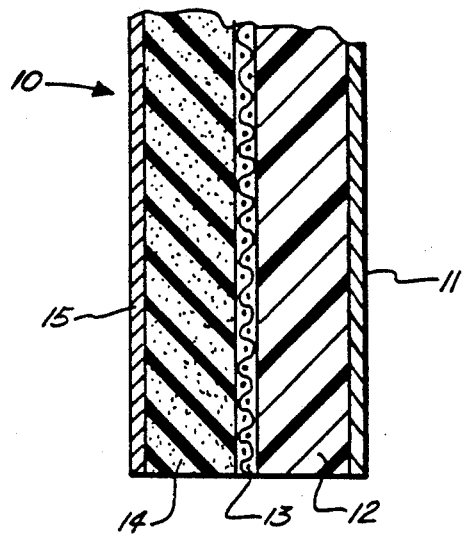
FIG. 1 is a sectional view illustrating the preferred embodiment of the apparatus of the present invention.
Figure 7:
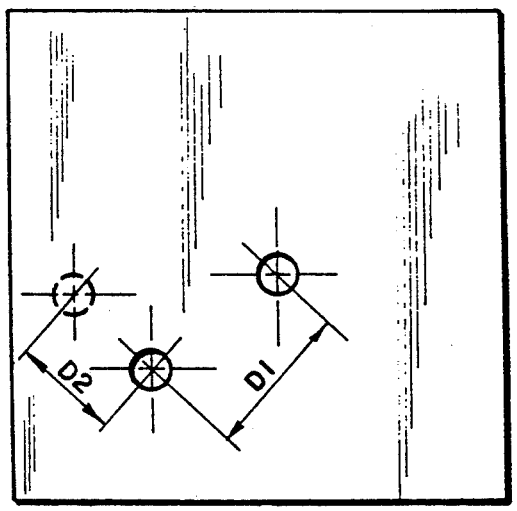
Figure 8:
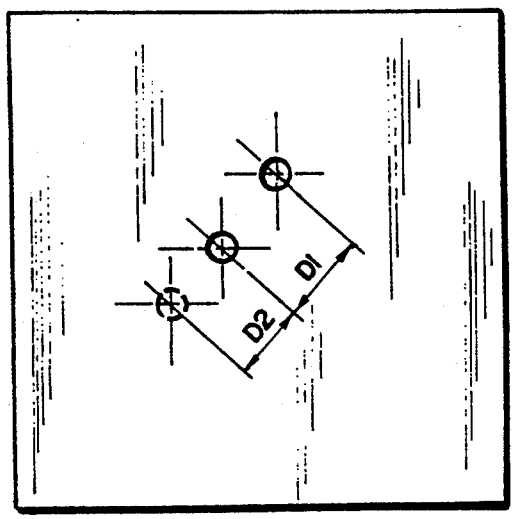

FIGS. 1, 7 and 8 illustrate the preferred embodiment of the apparatus of the present invention designated generally by the numeral 10.

In FIG. 1, there can be seen a sectional view of the layer of material which includes an outer strike face 11 which can be for example metal and preferably a heat treated chromium nickel alloy. In one embodiment, the strike face would be for example 0.073 inches thick.

The layer 12 is an energy absorbent, high strength layer of compression molded material such as a plurality of layers of fabric compression molded with a binder resin to form the composite of Spectra 900. Examples of suitable fabric include a polyethylene fabric such as Spectra 900 and Spectra 1000, available commercially from Allied Signal Corporation of Petersburg, Va. and Morristown, N.J. Also suitable is an aramid fabric such as Kevlar 29 and Kevlar 49 manufactured by Dupont. In one version, the layer 12 can have a weight of for example one to ten (1-10) pounds per square foot. As a specific example, the embodiment used to stop a NATO 7.62 mm round uses layer 12 approximately three quarter ($\frac{3}{4}$") inches thick and includes about 75-100 layers of fabric. The resin binder can be liquid binder such as Shell Krayton resin. A stainless steel or like high tensile strength alloy of wire mesh layer 13 is positioned at the rear surface of the layer 12. Behind the stainless steel wire layer 13, is energy absorbent material layer 14 which can be for example an elastomeric material such as a closed cell foam. Layer 14 can be a plurality of foam sheets e.g. 6 sheets of one eighth inch thick foam material, or a single $\frac{3}{4}$" sheet. The surface of the vessel to be protected is represented schematically by the layer 15 which would be for example the cabin of a boat, the hull of a boat or the like.

Figure 2:
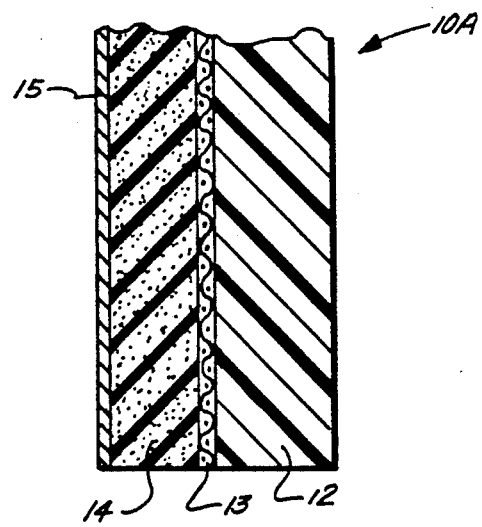
FIG. 2 is a sectional view illustrating another embodiment of the apparatus of the present invention.

In FIG. 2, another embodiment designated generally by the numeral 10A includes the same construction as FIG. 1 with the exception of the metal strike surface having been eliminated. The embodiment of FIG. 10A would have a lighter weight for the purpose of stopping small arms fire to a somewhat lesser degree than the embodiment in FIG. 1.

Figure 3:
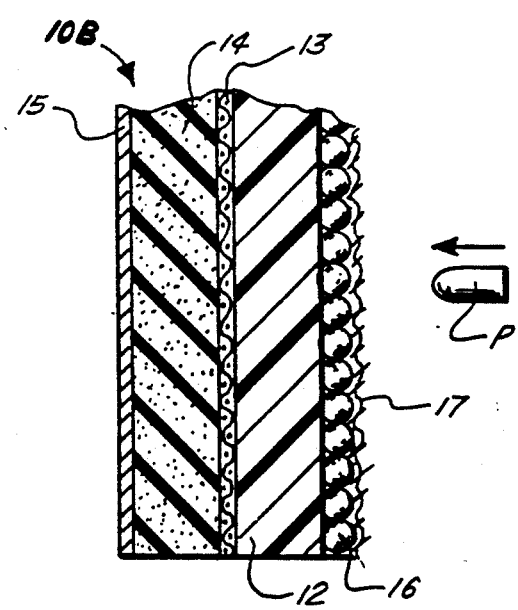
FIG. 3 is a sectional view illustrating a third embodiment of the apparatus of the present invention.

In FIG. 3, the vessel outer surface 15, the energy absorbent material 14, the stainless wire mesh 13, and the compression molded in the composite material layer 12 are provided. The embodiment 10B differs in that the strike face is comprised of an inner layer of aluminum oxide beads 16 and an outer strike face of woven mesh 17.

Figure 3A:
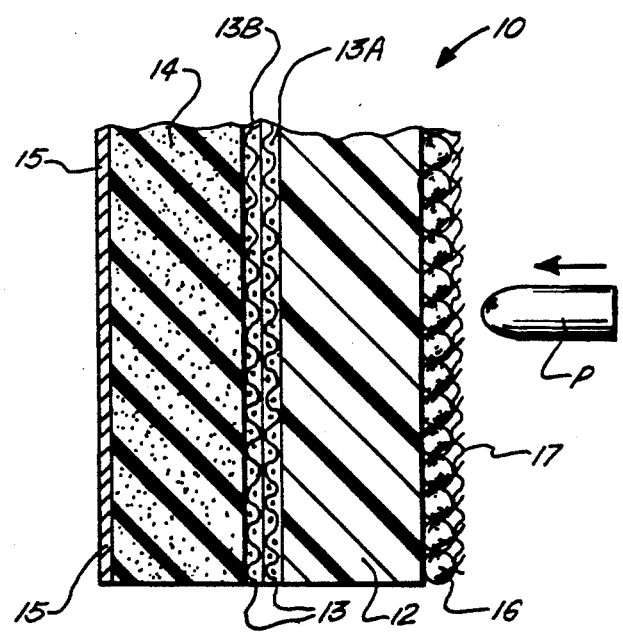
FIG. 3A is sectional view illustrating a fourth embodiment of the apparatus of the present invention.

In the embodiment of FIG. 3A, the stainless steel screen layer 13 is comprised of a pair of closely positioned layers 13A, 13B. The embodiment of FIG. 3A is used to stop 50 calibre rounds for example while the embodiments of FIGS. 1, 2 and 3 are used to stop small arms of fire of the calibres as indicated in the tables below.

Figure 4:
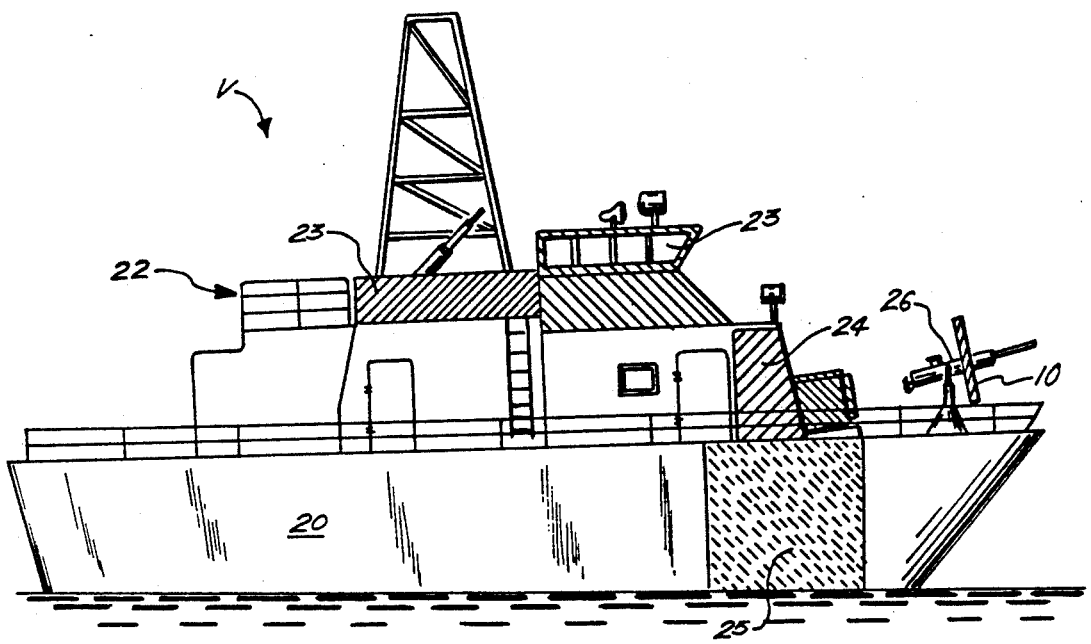
FIG. 4 is a side elevational view illustrating the preferred embodiment of the apparatus of the present invention as shown in position upon a pursuit vessel.
Figure 5:
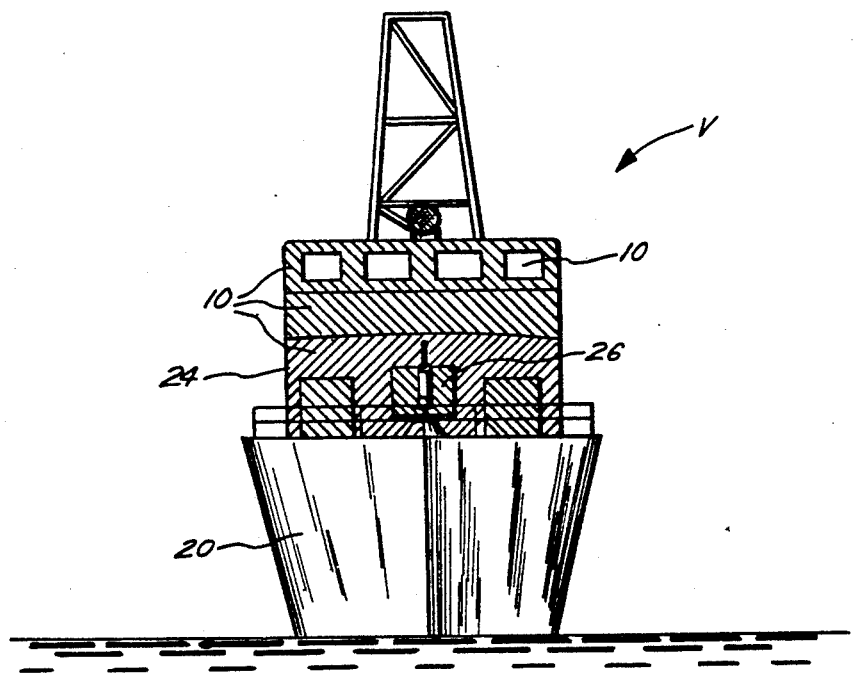
FIG. 5 is a front elevational view of the preferred embodiment of the apparatus of the present invention as shown in position upon a pursuant vessel.
Figure 6:
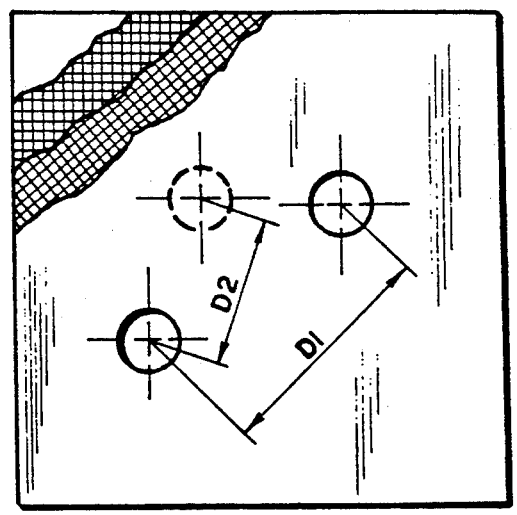
FIGS. 6, 7 and 8 illustrate graphically penetration performance information for various embodiments of the apparatus of the present invention when penetrated with arms fire.

In FIGS. 4 and 5, there can be schematically a vessel, designated generally by the letter V having a hull portion 20 and a superstructure portion 22 which are to be armored during operation. Armor plating is designated by the numeral 10 as covering strategic portions of the superstructure including cabin area 23, the computer room 24, munitions storage 25, as represented in a portion of the hull 20, and the forward gun position 26.

In the examples below, various embodiments of the present invention were subjected to projectile fire as more particularly described in the examples.

EXAMPLE 1

A layer of panel 10A was subjected to fire using FMJ 7.62 millimeter (30 calibre) military ball projectiles with velocities of less than 2,800 feet per second. Exit velocity was negligible when a 147 to a 150 grain bullet was fired into a previously undamaged area of the material 10. Exit velocity was fifty (50) feet per second when the same threat was repeated and fired within 1½ inches of a previous hit.

EXAMPLE 2

The embodiment of FIG. 1 was equipped with a strike face 11 having a ceramic (aluminum oxide) outer layer rather than metallic. The strike face of ¼ inch diameter of ceramic beads was laid in a resinous binder and reinforced with Spectra 900 fabric. The strike face was backed by three (3) pounds per square foot of compression molded Spectra fabric, as the layer 12, and high tensile strength alloy wire mesh 13 backed by ⅜ inch thick energy absorbent material 14 in the form of crosslinked polyethylene. Exit velocity was zero (0) when a projectile having a weight of 147 to 150 grains was fired as an FMJ 7.62 millimeter (30 calibre) military ball with a velocity of less than 2,800 square feet per second when hit in a previously undamaged area. The exit velocity was fifty (50) feet per second when the same threat was repeated and taken within one (1) inch of the previous hit.

EXAMPLE 3

The embodiment of FIG. 1, layer 10 was subjected to the same fire as described with respect to Examples 1 and 2, namely a FMJ 7.62 millimeter (30 calibre) military ball having a weight of 147–150 grain. In the third example, a metallic strike face of 0.073 thick heat treated chromium nickel alloy was backed by three (3) pounds per square foot of compression molded fabric, high tensile strength alloy wire mesh and ⅜ inch thick energy absorbent material 14. The exit velocity was zero (0) with velocities for the projectile of less than 2,800 feet per second and the exit velocity was 50 feet per second when the threat was repeated and fire taken within ⅝ inch of the previous hit.

Table 1 lists the specific "threats" (viz. Class I through Class VI) which can be defended using the panel construction of the present invention. Exemplary thickness dimension and weights of composite molded fabric as well as overall weight per square foot are included.

TABLE I

EXAMPLE OF ARMOR CONFIGURATION IN FIG. 2

| Threat Class | Weight of Armor | Construction | Typical Threat |
|---|---|---|---|
| I | 1.2 lb/ sq. ft. | Composite: 5/32" Wire Mesh: None Foam: ⅜" | .380 Auto Threat .22 Long Rifle .32 ACP |
| II | 1.5 lb/ sq. ft. | Composite: 3/16" Wire Mesh: 1 layer Foam: ⅜" | .45 Cal. ACP 12 Ga. Shotgun-Buckshot 9 MM Luger |
| IIA | 2.0 lb/ sq. ft. | Composite: ¼" Wire Mesh: 1 layer Foam: ⅜" | .357 Magnum .44 Magnum 9 MM High Powers |
| IIIA | 5.0 lb/ sq. ft. | Composite: 13/16 " Wire Mesh: 2 layers Foam: ⅜" | 7.62 MM NATO FMJ .30-60 FMJ 5.56 MM NATO FMJ |
| IV | 7.0 lb/ sq. ft. | Composite: 15/16" Wire Mesh: 3 layers Foam: 1" | 7.62 NATO A.P. .30-06 M-2 A.P. 7.62 Soviet A.P. |
| VI | 12.0 lb/ sq. ft. | Composite: 2" Wire Mesh: 6 layers Foam: 1½" | .50 Browning A.P. 12.7 MM Soviet A.P. |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A lightweight, composite armor lining for use in protecting objects such as vessels and like craft from powered high speed projectiles comprising:
   a) a plurality of layers of fabric compression molded with a binder resin to form a composite layer;
   b) an elastomeric foam material layer; and
   c) an intermediate wire mesh layer.

2. The lining of claim 1 wherein the armor lining apparatus has a weight of less than eight pounds per square foot of surface area.

3. The lining of claim 2, wherein the wire mesh layer is a high tensile strength mesh wire.

4. The lining of claim 2, wherein:
   the wire mesh layer is a high tensile strength mesh wire; and
   there are multiple layers of wire mesh positioned adjacent one another.

5. A lightweight, composite armor lining for use in projecting objects such as vessels and like craft from powered high speed projectiles comprising:
   a) a plurality of laminated layers of fabric compression molded with a binder resin to form a composite layer having an outer "strike" surface being positioned to receive incoming projectiles;
   b) a layer of elastomeric foam material, wherein the layer of elastomeric foam material has an inner attachment surface adjacent to an object to be protected; and
   c) a wire mesh layer intermediate the layer of elastomeric foam material and the composite layer.

6. The lining of claim 5, further comprising:
   a metal layer between the composite layer and the outer "strike" surface.

7. The lining of claim 6, wherein:

the metal in the metal layer is a chromium-nickel alloy
the wire mesh layer comprises stainless steel wire and
the layer of elastomeric "foam" material comprises closed-cell foam.

8. The lining of claim 5 or 7, wherein
the composite layer comprises polyethylene.

9. The lining of claim 5 or 6, further comprising:
a second wire mesh layer intermediate the composite layer and the elastomeric foam material layer.

10. The lining of claim 1 or 5, further comprising:
a layer of ceramic beads opposite the wire mesh layer and next to the composite layer and a layer of woven mesh adjacent the layer of ceramic beads.

11. The lining of claim 19, further comprising:
a second wire mesh layer intermediate the composite layer and the elastomeric layer.

12. A lightweight, composite armor lining article for use in protecting objects such as vessels and like craft from powered high speed projectiles comprising:

a) a plurality of layers of fabric compression molded with a binder resin to form a composite layer having an outer "strike" surface being positioned to receive incoming projectiles and an inner attachment surface adjacent to an object to be protected;
b) a metal layer adjacent the outer "strike" surface;
c) a wire mesh layer adjacent the composite layer;
d) a layer of elastomeric "foam" material adjacent the inner attachment surface, wherein the wire mesh layer is intermediate the layer of elastomeric material and the composite layer.

13. The lining of claim 1 or 5 wherein the elastomeric foam material has a thickness of about 0.75 inches.

14. The lining of claim 1 or 5 wherein the elastomeric foam material is at least 0.75 inches thick.

15. The lining of claim 5 wherein the lining can receive and catch without complete penetration therethrough a class 6 threat projectile.

16. The lining of claim 5 wherein the lining can receive and catch without complete penetration therethrough an incoming class 5 threat projectile.

* * * * *